United States Patent
Kim et al.

(10) Patent No.: US 8,421,332 B2
(45) Date of Patent: Apr. 16, 2013

(54) CAPACITIVE TOUCH SCREEN AND METHOD FOR MANUFACTURING THE SAME

(75) Inventors: Woon Chun Kim, Gyunggi-do (KR); Yong Soo Oh, Gyunggi-do (KR); Jae Il Kim, Gyunngi-do (KR); Jong Young Lee, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 231 days.

(21) Appl. No.: 12/978,864

(22) Filed: Dec. 27, 2010

(65) Prior Publication Data
US 2012/0098781 A1    Apr. 26, 2012

(30) Foreign Application Priority Data
Oct. 21, 2010    (KR) ...................... 10-2010-00103023

(51) Int. Cl.
*H01J 29/10*    (2006.01)

(52) U.S. Cl.
USPC ............................ 313/463; 313/473; 345/174

(58) Field of Classification Search .................. 345/173, 345/174; 313/463, 466, 473, 476
See application file for complete search history.

(56) References Cited

U.S. PATENT DOCUMENTS
2012/0056844 A1 *    3/2012    Kim et al. ...................... 345/174
2012/0062507 A1 *    3/2012    Kim et al. ...................... 345/174

* cited by examiner

*Primary Examiner* — Vip Patel
(74) *Attorney, Agent, or Firm* — Ladas & Parry LLP

(57) ABSTRACT

Disclosed herein are a capacitive touch screen and a method for manufacturing the same. The capacitive touch screen includes: a base member on which a plurality of electrode patterns are formed; conductive adhesive members formed at ends of the electrode patterns; a window disposed over the base member and having a plurality of electrode wirings formed in an outer region thereof, the plurality of electrode wirings being opposite to the electrode patterns; and auxiliary electrodes formed at one of the ends of the electrode wirings to conduct the electrode patterns with the electrode wirings by the conductive adhesive members.

12 Claims, 5 Drawing Sheets

CAPACITIVE TOUCH SCREEN AND METHOD FOR MANUFACTURING THE SAME

CROSS REFERENCE TO RELATED APPLICATION

This application claims the benefit of Korean Patent Application No. 10-2010-0103023, filed on Oct. 21, 2010, entitled "Capacitive Touch Screen And Method For Manufacturing The Same", which is hereby incorporated by reference in its entirety into this application.

BACKGROUND OF THE INVENTION

1. Technical Field

The present invention relates to a capacitive touch screen and a method for manufacturing the same.

2. Description of the Related Art

With the development of a mobile communication technology, user terminals such as cellular phones, PDAs, and navigations can serve as a display unit that simply displays character information as well as a unit for providing various and complex multi-media such as audio, moving picture, radio internet web browser, etc. Due to a recent demand for a larger display screen within a terminal having a limited size, a display scheme adopting a touch screen has been more in the limelight. The touch screen integrates a screen and coordinate input units, thereby making it possible to save a space as compared to a key input scheme according to the prior art.

A type of current mainly used touch screen is largely classified into two types.

First, a resistive touch screen has a shape in which an upper substrate formed with an upper resistive film and a lower substrate formed with a lower resistive film are spaced from each other by a spacer and are disposed to be in contact with each other by external pressure. When an upper substrate formed with an upper electrode film is pressed by an input unit such as fingers, pens or the like, the upper/lower electrode films are conducted and a change in voltage according to a change in resistance value of the positions is recognized by a controller, such that the touched coordinates are recognized.

A capacitive touch screen has a structure in which an upper substrate formed with a first electrode pattern having a first directionality and a lower substrate formed with a second electrode pattern having a second directionality are spaced from each other and an insulator is inserted therebetween in order to prevent the first electrode pattern from contacting the second electrode pattern. In addition, the upper substrate and the lower substrate are formed with electrode wirings connected to the electrode patterns. The electrode wirings transfer the change in capacitance generated in the first electrode pattern and the second electrode pattern by the touch on the touch screen to a controller.

With the recent increase in the efficiency of a multi-touch, research into increasing electrode patterns has been conducted in the capacitive touch screen. Accordingly, the number of the electrode wirings is also increased.

The capacitive touch screen according to the prior art forms the electrode patterns and the electrode wirings by separately configuring the upper substrate and the lower substrate, such that the configuration of the touch screen becomes complicated. A separate insulator is required in order to space the electrode patterns formed on the upper substrate and the lower substrate.

In addition, a portion of the capacitive touch screen according to the prior art is configured in a single layer structure rather than a double-layer structure. However, in the single-layer capacitive touch screen according to the prior art, the electrode patterns and the electrode wirings formed on the same plane have a complicated configuration, thereby causing a short-circuit between the electrode wirings.

In addition, the single-layer capacitive touch screen according to the prior art has several problems during the manufacturing process thereof. Since the electrode patterns and the electrode wirings are formed on the same member, damages occur on the electrode patterns when the electrode wirings are formed after the electrode patterns are formed or vice versa. In particular, when the electrode pattern is made of a conductive polymer and an etching process or an annealing process is performed while forming the electrode patterns, modification of the conductive polymer is generated to change sheet resistance in the electrode patterns.

SUMMARY OF THE INVENTION

The present invention has been made in an effort to provide a capacitive touch screen which disposes an electrode pattern and an electrode wiring on different planes to improve the degree of freedom in design and prevent defects in the electrode wiring and the electrode pattern.

Further, the present invention has been made in an effort to provide a capacitive touch screen which includes a conductive adhesive member formed on the electrode pattern and an auxiliary electrode formed on the electrode wiring, when forming a connection structure of the electrode pattern and the electrode wiring, to have improved connection reliability between the electrode pattern and the electrode wiring.

Further, the present invention has been made in an effort to provide a method for manufacturing a capacitive touch screen which forms an electrode pattern on a base member and an electrode wiring on a window and then connects the electrode pattern to the electrode wiring by a conductive adhesive member and an auxiliary electrode to manufacture a touch screen without defects in the electrode pattern during the process of forming the electrode wiring.

According to a preferred embodiment of the present invention, there is provided a capacitive touch screen, including: a base member on which a plurality of electrode patterns are formed; conductive adhesive members formed at ends of the electrode patterns; a window disposed over the base member and having a plurality of electrode wirings formed in an outer region thereof, the plurality of electrode wirings being opposite to the electrode patterns; and auxiliary electrodes formed at one of the ends of the electrode wirings to conduct the electrode patterns with the electrode wirings by the conductive adhesive members.

An area of the auxiliary electrode may correspond to that of the conductive adhesive member.

The capacitive touch screen may further include a covering film formed on an upper outer region of the window to cover the electrode wirings.

The electrode pattern may be made of a conductive polymer.

The electrode pattern may include a first electrode pattern and a second electrode pattern intersected with each other, wherein the first electrode pattern includes first connectors connecting a plurality of first sensors to the adjacent first sensors, the second electrode pattern includes second connectors connecting a plurality of second sensors formed on the same plane as the first sensors to the adjacent second sensors, and the second connectors are formed over the first connectors to intersect therewith.

The capacitive touch screen may further include an insulating pattern disposed between the first connector and the second connector to prevent the first connector from contacting the second connector.

According to another preferred embodiment of the present invention, there is provided a method for manufacturing a capacitive touch screen, including: forming a plurality of electrode patterns on one surface of a base member and forming a conductive adhesive member at ends of the electrode patterns; forming a plurality of electrode wirings on one surface of a window and forming auxiliary electrodes at one of the ends of the electrode wirings; and coupling the base member to the window so that the auxiliary electrodes are adhered to the conductive adhesive members to conduct the electrode wirings with the electrode patterns.

The electrode wiring may be made of a metal and be formed by a sputtering method.

The electrode pattern may be made of a conductive polymer.

The method for manufacturing a touch screen may further include forming a covering film covering the electrode wirings in an upper outer region of the window.

The method for manufacturing a capacitive touch screen may further include, prior to the coupling the base member to the window, forming a double-sided adhesive member bonding the base member to the window in an upper outer region of the base member or a lower outer region of the window.

The capacitive touch screen may further include a double-sided adhesive member formed in an upper outer region of the base member to bond the window to the base member.

DESCRIPTION OF THE PREFERRED EMBODIMENTS

Figure 1:
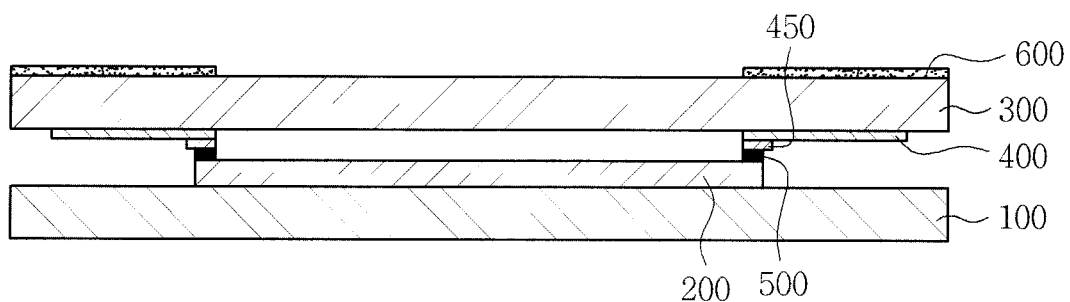
FIG. 1 is a cross-sectional view schematically showing a capacitive touch screen according to the present invention.

Various objects, advantages and features of the invention will become apparent from the following description of embodiments with reference to the accompanying drawings.

The terms and words used in the present specification and claims should not be interpreted as being limited to typical, meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
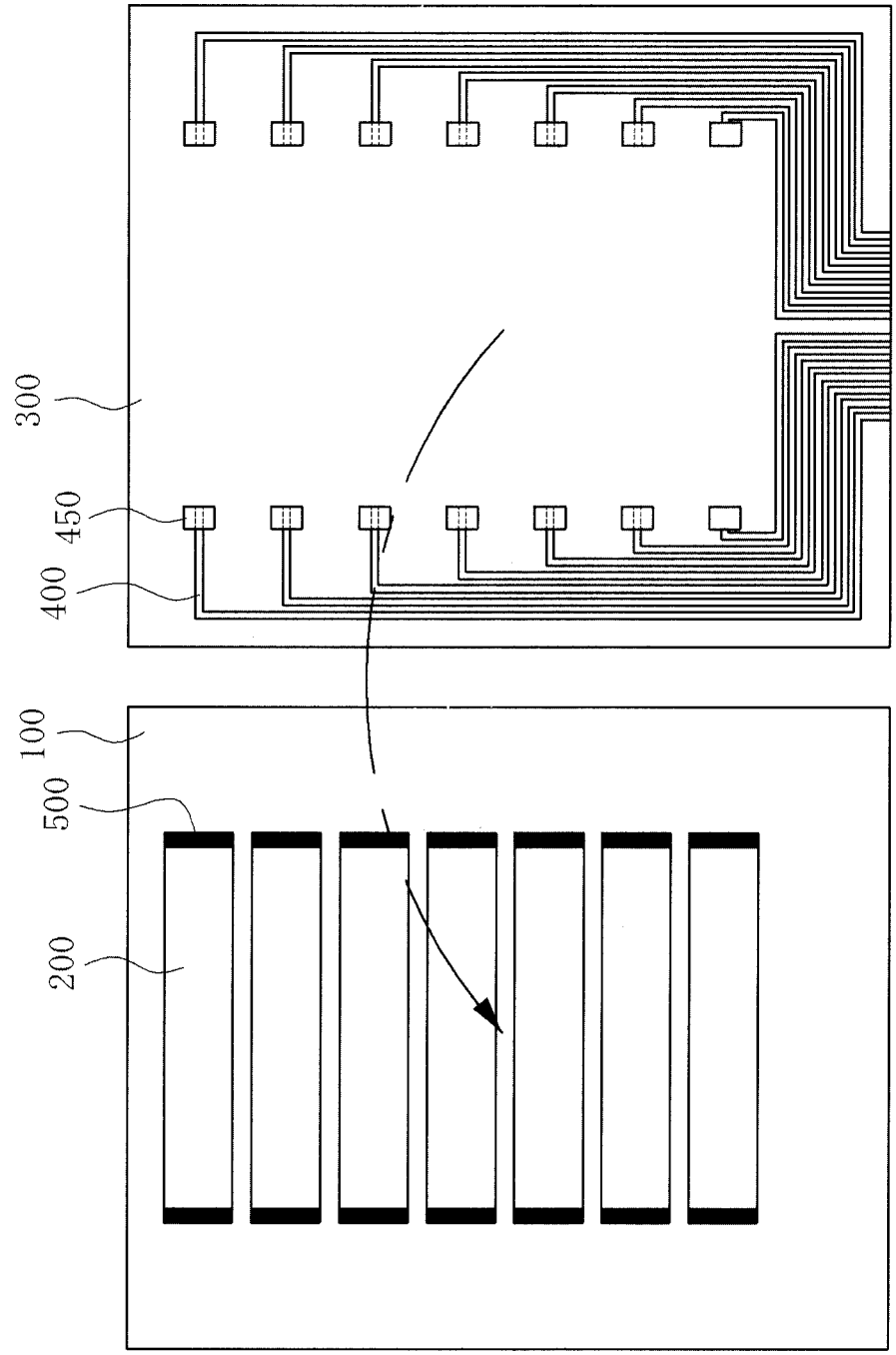
FIG. 2 is a plan view showing an upper surface of a base member and a rear surface of a window of the touch screen of FIG. 1.

FIG. 1 is a cross-sectional view briefly showing a capacitive touch screen according to the present invention, and FIG. 2 is a plan view showing an upper surface of a base member and a rear surface of a window of the touch screen of FIG. 1. Hereinafter, a capacitive touch screen (hereinafter, referred to as a touch screen) according to the present embodiment will be described with reference to these figures.

In the touch screen according to the present invention, a plurality of electrode patterns 200 are formed on a base member 100 and electrode wirings 400 connected to the electrode patterns 200 are formed on a window 300, wherein the electrode patterns 200 are conducted with the electrode wirings 400 by a conductive adhesive members 500 formed at ends of the electrode patterns 200 and auxiliary electrodes 450 formed at one end of each of the electrode wirings.

The base member 100, which is a transparent member, may use a glass substrate, a film substrate, a fiber substrate, and a paper substrate. Among them, the film substrate may be made of polyethylene terephthalate (PET), polymethylemethacrylate (PMMA), polypropylene (PP), polyethylene (PE), polyethylenenaphatalate (PEN), polycarbonate (PC), polyethersulfone (PES), polyimide (PI), polyvinylalcohol (PVA), cyclic olefin copolymer (COC), stylene polymer, etc. The material of the base member 100 may be selected according to the kind and the use of a terminal to which the touch screen is applied.

The electrode pattern 200 may use a conductive material such as indium tin oxide (ITO). The electrode pattern 200 may be formed by printing the conductive material through a known method such as a gravure printing method, an inkjet printing method, a photolithography method, or the like.

In this case, it is preferable that the electrode pattern 200 is made of a conductive polymer. The conductive polymer may include an organic compound, such as polythiophene, polypyrrole, polyaniline, polyacetylene, polyphenylene, or the like. In particular, among the polythiophene, poly-3,4-ethylenedioxythiophene/polystyrenesulfonate (PEDOT/PSS) compound is most preferable and at least one of the organic compound may be mixed. The conductive polymer has low manufacturing costs and flexibility, while having a sheet resistance which equals to the ITO, thereby being able to be applied to a flexible display.

The shape of the electrode pattern 200 may be variously modified. As shown in FIG. 2, bar-type electrode patterns 200 are generally used. In this case, the plurality of electrode patterns 200 are formed to be in parallel with adjacent electrode patterns having a bar shape so as to have uniform resistance. In this case, the plurality of electrode pattern may have the same area and shape.

The touch screen according to the present invention includes the window 300 disposed over the base member 100 and having the plurality of electrode wirings 400 formed in an outer region thereof to be opposite to the electrode patterns 200.

The window 300 covers the electrode patterns 200 and provides a touch surface that is touched by an input unit. The window 300 may use a glass substrate, a film substrate, a fiber substrate, and a paper substrate.

The electrode wirings 400 made of a conductive material are formed in the outer region of the window 300. The inner region of the touch screen, including the window 300, is an active region through which images pass, such that the electrode patterns 200 disposed in the inner region are made of a transparent conductive material. However, the outer region thereof is an inactive region through which images do not pass, such that the electrode wirings 400 are not always required to be transparent. Therefore, the electrode wiring 400 may be made of a metal material having small resistance, such as silver (Ag) paste, or be made of the same material as that of the electrode pattern 200.

In order to connect the electrode pattern 200 formed on the base member 100 to the electrode wiring 400 formed on the window 300, a conductive adhesive member 500 is formed at an end of the electrode pattern 200 and an auxiliary electrode 450 is formed at one end of the electrode wiring.

The present invention forms the fine electrode wirings 400 by a sputtering method in order to reduce the inactive region. However, if the base member 100 is not aligned with the window 300, the electrode pattern 200 may not be connected to the electrode wiring 400 due to the narrow width of the electrode wiring 400. In order to prevent the problem, the auxiliary electrode 450 widening a connection area is formed at one end of the electrode wiring 400.

The electrode pattern 200 is conducted with the electrode wiring 400 by the conductive adhesive member 500 formed at the end of the electrode pattern 200 and the auxiliary electrode 450.

At this time, the area of the auxiliary electrode 450 may preferably correspond to that of the conducive adhesive member 500 in order to improve connection reliability and prevent a short-circuit between the electrode pattern and the electrode wiring.

Meanwhile, the plurality of electrode wirings 400 formed on the lower surface of the window 300 to be opposite to the electrode patterns 200 may preferably have one ends connected to the electrode patterns 200 and another ends collected at one side of the window 300. The reason is that the plurality of electrode wirings 400 are easily connected to a FPC when a change in capacitance generated from the electrode patterns 200 is transferred to a controller.

Although the electrode wirings 400 are connected to both ends of the electrode pattern 200 in FIGS. 1 and 2, this is merely one example, and thus the electrode wirings 400 may also be connected to only one end of the electrode pattern 200 according to a coordinate detecting scheme of the touch screen. Although the electrode wirings 400 are connected to only one end of the electrode pattern 200, if a small amount of charge is applied to the electrode pattern 200 through the electrode wirings 400, the small amount of charge is supplied to an RC equivalent circuit formed of resistance component and capacitance and then a charge redistribution phenomenon according to an external touch occurs. The controller measures the change in voltage generated therefrom, thereby making it possible to calculate the coordinates of the touched points. The coordinate detecting scheme has been well-known and thus a detailed description thereof will be omitted.

In addition, an optical adhesive layer (not shown) may further be formed between the electrode pattern 200 and the lower surface of the window 300 in order to reinforce adhesion between the electrode pattern 200 and the electrode wiring 400 by the conductive adhesive member 500.

The capacitive touch screen according to the present invention may more preferably have a covering film 600 formed on the upper outer region of the window 300 so as to cover the electrode wiring 400 formed on the lower surface of the window 300. When the electrode wiring 400 is made of a metal such as silver paste, the electrode wiring 400 may be recognized from the outside. In order to prevent it, the covering film 600 is provided. The covering film 600 may be formed by printing ink having low brightness, for example, black ink, on the upper outer region of the window 300.

Figure 3:
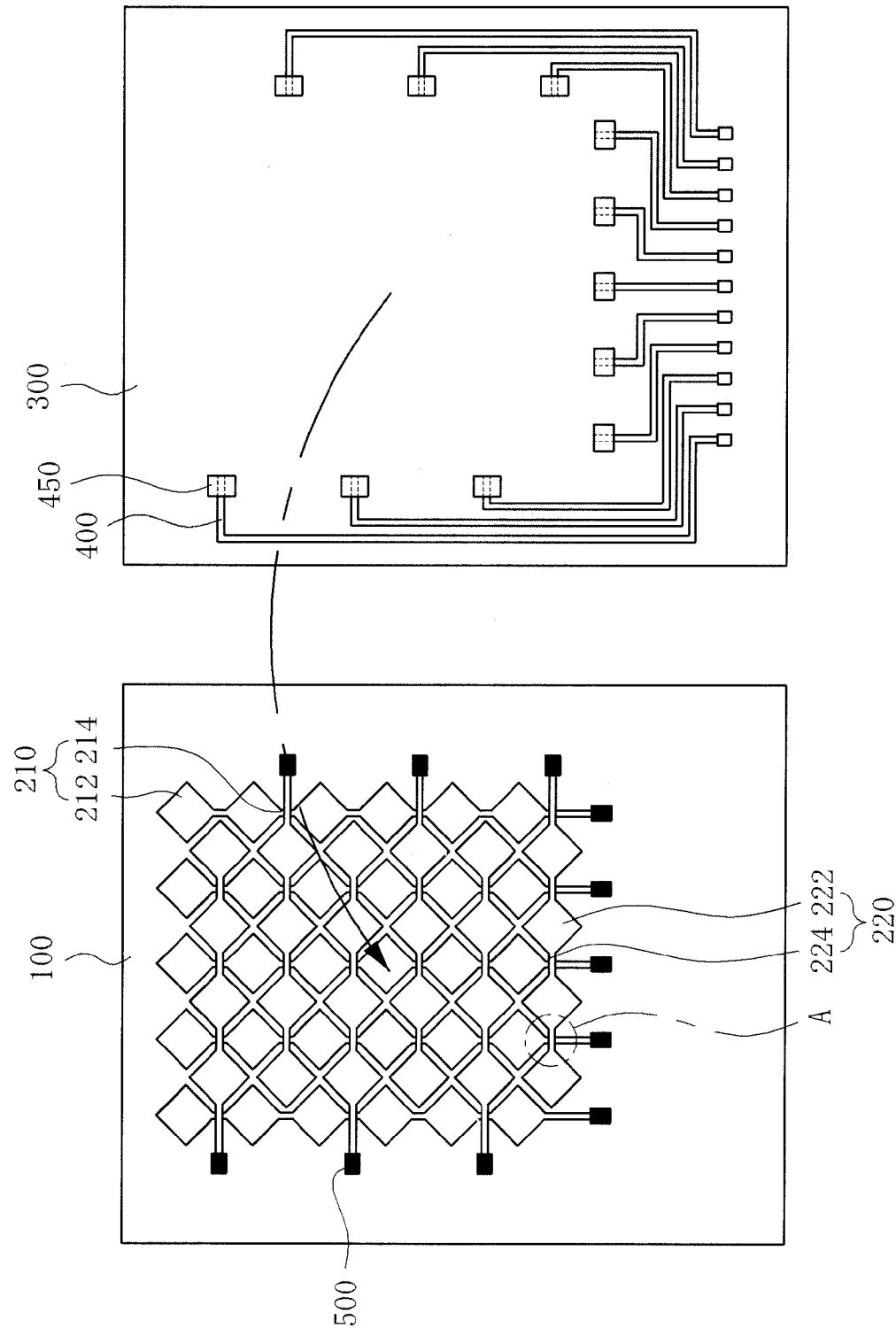
FIG. 3 is a plan view showing an upper surface of a base member and a rear surface of a window according to another embodiment of the present invention.
Figure 4:
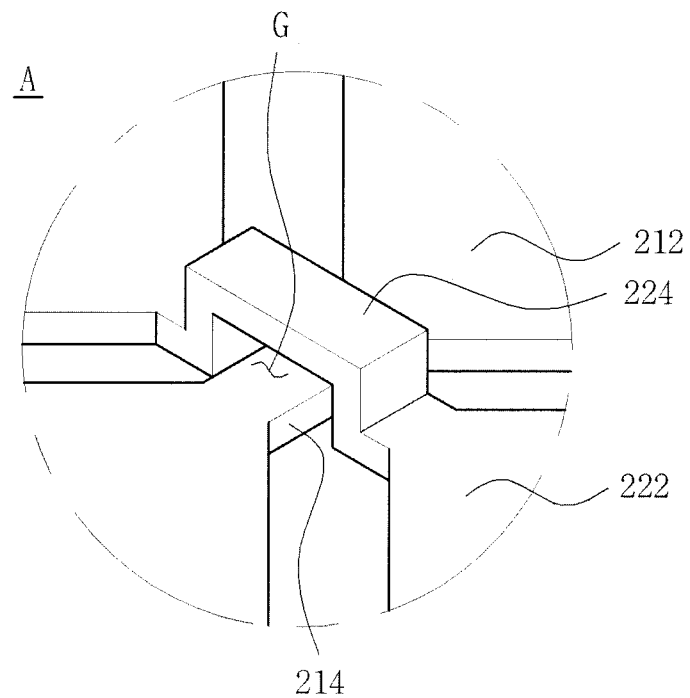
FIGS. 4 and 5 are enlarged views showing the electrode patterns of FIG. 3 in detail.
Figure 5:
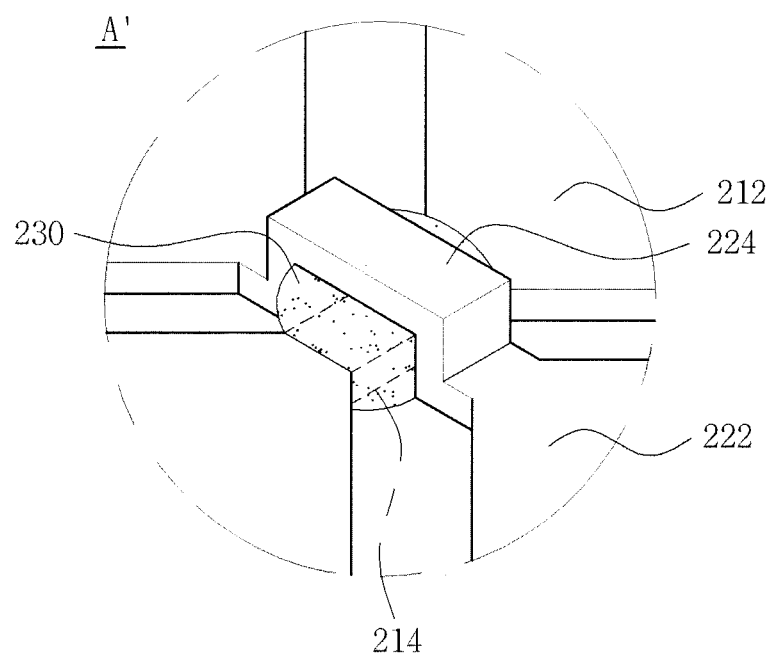

FIG. 3 is a plan view showing an upper surface of a base member and a rear surface of a window according to another embodiment of the present invention, and FIGS. 4 and 5 are enlarged views showing the electrode patterns of FIG. 3 in detail. Hereinafter, a capacitive touch screen (hereinafter, referred to as a touch screen) according to another embodiment of the present invention will be described with reference to these figures. However, a detailed description of the same configuration as that described with reference to FIGS. 1 to 2 will be omitted.

In the touch screen according to the present invention, first electrode patterns 210 and second electrode patterns 220 having directionalities intersecting with each other are formed on a base member 100. In the touch screen shown in FIG. 2, the electrode patterns have the same directionality. However, in the touch screen according to the present embodiment, the electrode patterns 210 and 220 having different directionalities are formed on the base member 100, thereby making it possible to more accurately measure the coordinates of the touched points and implement a multi-touch.

The first electrode patterns 210 are provided with a plurality of electrode patterns formed in parallel on the upper surface of the base member 100 in a first direction (Y direction), wherein a first sensor 212 and a first connector 214 are repeated. In this case, the first sensor 212 is a portion in which a change in capacitance is measured when the touch screen is touched by a user's hand, and the first connector 214 is a portion which connects the plurality of first sensors 212.

Meanwhile, although the first sensor 212 has a diamond shape in FIG. 3, this is provided by way of example only. Therefore, the first sensor 212 may be modified to have other polygonal shapes.

The second electrode patterns 220 are formed on the upper surface of the base member 100 in the same manner of the first electrode patterns 210 as described above. In addition, the second electrode patterns 220 are provided with a plurality of electrode patterns formed in parallel in a second direction (X direction), wherein a second sensor 222 and a second connector 224 are repeated In this case, the second connector 224 is formed over the first connector 214 to intersect with each other (bridge structure), such that the second electrode pattern 220 is not connected to the first electrode pattern 210 and is electrically separate therefrom.

Describing the bridge structure in more detail with reference to FIGS. 4 and 5, the second connector 224 may intersect with the first connector 214 formed on the base member 100, having an air gap G therebetween, or the first connector 214 and the second connector 224 may form the bridge structure by having an insulating pattern 230 preventing the first connector from contacting the second connector therebetween. In this case, the insulating pattern 230 is made of a transparent resin material.

The bridge structure shown in FIG. 4 may minimize the generation of parasitic capacitance and the bridge structure shown in FIG. 5 may increase stability of the second connector 224, thereby making it possible to prevent a short-circuit between the second connector 224 an the first connector 214.

Meanwhile, the conductive adhesive member 500 connecting the electrode patterns 210 and 220 to the electrode wiring 400 and the auxiliary electrode 450 are provided at the ends of the electrode patterns 210 and 220 and one end of the electrode wiring 400.

Figure 6:
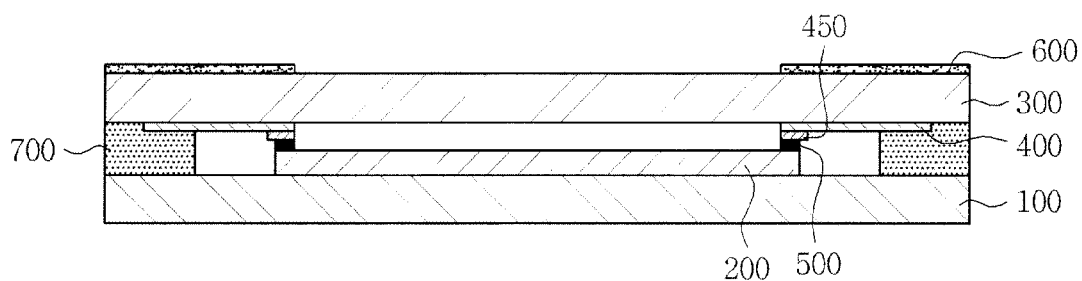
FIG. 6 is a cross-sectional view briefly showing a modified example of the touch screen of FIG. 1.

FIG. 6 is a cross-sectional view briefly showing a modified example that can be applied to the touch screen shown in FIGS. 1 to 5. Hereinafter, still another embodiment of the present invention will be described with reference to the figure.

First, as shown in FIG. 6, the touch screen according to the present embodiment further includes a double-sided adhesive member 700 formed on the upper outer region (or the lower outer region of the window 300) of the base member 100 to bond the window 300 to the base member 100.

The double-sided adhesive member 700 supports the window 300 disposed on the upper side thereof to make the touch screen firm and prevents foreign material generated from the outside from being infiltrated into the inside of the touch screen.

Figure 7:
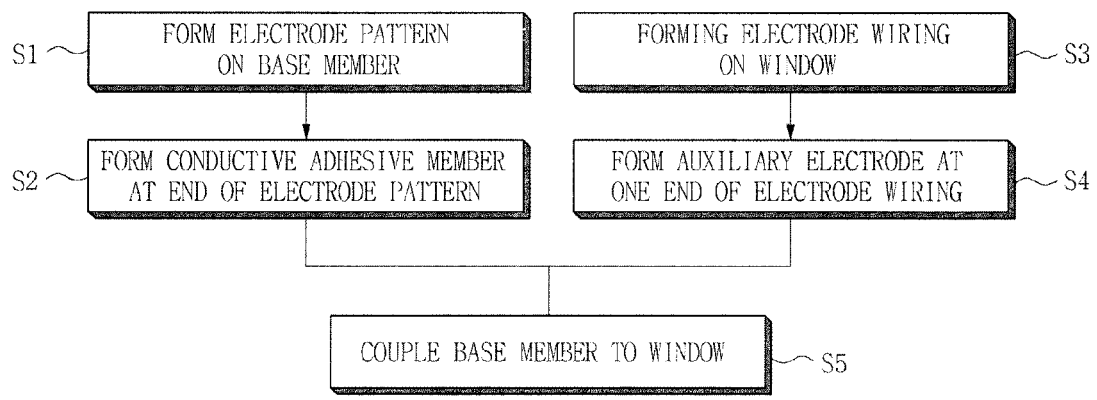
FIG. 7 is a flow chart showing a process of manufacturing a capacitive touch screen according to the present invention.

FIG. 7 is a flow chart showing a process of manufacturing a capacitive touch screen according to the present invention. A method for manufacturing a touch screen according to the present embodiment will be described with reference to this figure.

The manufacturing method according to the present invention forms the electrode patterns 200 on the base member 100 and the electrode wirings 400 on the window 300, respectively.

The touch screen according to the prior art forms the electrode pattern and the electrode wiring on a single substrate sequentially or simultaneously, thereby causing a problem in that a short-circuit is generated between the electrode pattern and the electrode wiring or any one of them first formed is damaged.

In particular, when the electrode pattern is made of a conductive polymer, a problem arises in that the conductive polymer weak against moisture and heat is modified during a process of forming the electrode wiring. Therefore, a problem arises in that a wet etching process or an annealing process is limited when the electrode wirings are directly formed on the base member.

The manufacturing method according to the present invention forms the electrode pattern and the electrode wiring on different members, respectively, to solve the above problems, and allows the electrode pattern to be conducted with the electrode wiring by the conductive adhesive member and the auxiliary electrode to form a touch screen.

More specifically, the plurality of electrode patterns are first formed on one surface of the base member (S1) and the conductive adhesive member is formed at ends of the electrode patterns (S2). Then, the plurality of electrode wirings are formed on one surface of the window (S3), and the auxiliary electrodes are formed at one of the ends of the electrode wirings (S4). The sequence of the four steps may be changed.

The electrode pattern may be formed by a photolithography method, an inkjet printing method, a gravure printing method. The conductive adhesive member may be attached to the ends of the electrode patterns. The electrode wiring may be formed by printing silver paste or forming a metal layer using a sputtering method and then patterning it. The auxiliary electrode may be formed by printing a metal material having resistance equal to or lower than that of the electrode wiring.

In addition, when a structure covering the electrode wirings is to be formed on the touch screen itself without a bezel structure using a housing, the manufacturing method may further include forming a covering film. Ink having low brightness, such as black ink, is printed on the upper outer region of the window, thereby forming a covering film.

Thereafter, the base member is coupled to the window by the conductive adhesive member and the auxiliary electrode so that the electrode wirings are conducted with the electrode patterns (S5).

In addition, prior to the coupling the base member to the window, the manufacturing method further include forming the double-sided adhesive member bonding the base member to the window on the upper outer region of the base member or the lower outer region of the window. As the double-sided adhesive member, a double-sided adhesive sheet may be used. During the process of bonding the base member to the window, the double-sided adhesive member is disposed between the base member and the window, thereby making the touch screen firm and preventing foreign material generated from the outside from being infiltrated into the inside of the touch screen.

In the capacitive touch screen according to the present invention, the electrode patterns are formed on the base member and the electrode wirings are formed on the window so that the electrode patterns and the electrode wirings are disposed on different planes, thereby making it possible to solve the problem of short-circuit between the electrode patterns and the electrode wirings.

When forming the connection structure between the electrode patterns and the electrode wirings, the capacitive touch screen includes the conductive adhesive member formed on the electrode pattern and the auxiliary electrode formed on the electrode wiring, thereby making it possible to improve connection reliability between the electrode patterns and the electrode wirings.

In addition, the method for manufacturing the capacitive touch screen according to the present invention forms the electrode wirings and the electrode patterns on the base member and the window, respectively and then couples them, thereby making it possible to prevent defects generated from the electrode patterns or the electrode wirings during the process of forming the electrode wirings or the electrode patterns. In particular, when the electrode pattern is made of a conductive polymer, although an etching process or an annealing process is performed during the process of forming the electrode wiring, it is possible to prevent the electrode patterns from being modified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A capacitive touch screen, comprising:
   a base member on which a plurality of electrode patterns are formed;
   conductive adhesive members formed at ends of the electrode patterns;
   a window disposed over the base member and having a plurality of electrode wirings formed in an outer region thereof, the plurality of electrode wirings being opposite to the electrode patterns; and auxiliary electrodes formed at one of the ends of the electrode wirings to conduct the electrode patterns with the electrode wirings by the conductive adhesive members.

2. The capacitive touch screen as set forth in claim 1, wherein an area of the auxiliary electrode corresponds to that of the conductive adhesive member.

3. The capacitive touch screen as set forth in claim 1, further comprising a covering film formed on an upper outer region of the window to cover the electrode wirings.

4. The capacitive touch screen as set forth in claim 1, wherein the electrode pattern is made of a conductive polymer.

5. The capacitive touch screen as set forth in claim 1, wherein the electrode pattern includes a first electrode pattern and a second electrode pattern intersected with each other,
the first electrode pattern including first connectors connecting a plurality of first sensors to the adjacent first sensors,
the second electrode pattern including second connectors connecting a plurality of second sensors formed on the same plane as the first sensors to the adjacent second sensors,
the second connectors formed over the first connectors to intersect therewith.

6. The capacitive touch screen as set forth in claim 5, further comprising an insulating pattern disposed between the first connector and the second connector to prevent the first connector from contacting the second connector.

7. The capacitive touch screen as set forth in claim 1, further comprising a double-sided adhesive member formed in an upper outer region of the base member to bond the window to the base member.

8. A method for manufacturing a capacitive touch screen, comprising:
forming a plurality of electrode patterns on one surface of a base member and forming conductive adhesive member at ends of the electrode patterns;
forming a plurality of electrode wirings on one surface of a window and forming auxiliary electrodes at one of the ends of the electrode wirings;
coupling the base member to the window so that the auxiliary electrodes are adhered to the conductive adhesive members to conduct the electrode wirings with the electrode patterns.

9. The method for manufacturing a capacitive touch screen as set forth in claim 8, wherein the electrode wiring is made of a metal and is formed by a sputtering method.

10. The method for manufacturing a capacitive touch screen as set forth in claim 8, wherein the electrode pattern is made of a conductive polymer.

11. The method for manufacturing a capacitive touch screen as set forth in claim 8, further comprising forming a covering film covering the electrode wirings in an upper outer region of the window.

12. The method for manufacturing a capacitive touch screen as set forth in claim 8, further comprising, prior to the coupling the base member to the window, forming a double-sided adhesive member bonding the base member to the window in an upper outer region of the base member or a lower outer region of the window.

* * * * *